US006854057B2

United States Patent
Roskind et al.

(10) Patent No.: US 6,854,057 B2
(45) Date of Patent: Feb. 8, 2005

(54) DIGITAL CERTIFICATE PROXY

(75) Inventors: James Anthony Roskind, Redwood City, CA (US); Terry N. Hayes, Los Altos, CA (US); Robert Lord, Palo Alto, CA (US)

(73) Assignee: America Online, Inc., Dulles, VA (US)

( * ) Notice: Subject to any disclaimer, the term of this patent is extended or adjusted under 35 U.S.C. 154(b) by 510 days.

(21) Appl. No.: 09/948,381

(22) Filed: Sep. 6, 2001

(65) Prior Publication Data

US 2003/0046544 A1 Mar. 6, 2003

(51) Int. Cl.[7] .............................. H04L 9/32; H04L 9/10
(52) U.S. Cl. ...................... 713/156; 713/158; 713/159; 713/173; 705/65
(58) Field of Search ................................ 713/156, 158, 713/159, 172, 173, 185; 705/65, 66, 67, 1

(56) References Cited

U.S. PATENT DOCUMENTS 6,016,476 A * 1/2000 Maes et al. .................... 705/1
6,216,231 B1   4/2001 Stubblebine ................. 713/201
6,510,523 B1   1/2003 Perlman et al. ............. 713/201

FOREIGN PATENT DOCUMENTS

EP          1 117 207 A2      7/2001         ............. H04L/9/32

OTHER PUBLICATIONS

Tuecke et al., *Proxy Certificate Profile*, Aug. 2001, www.letf.org/internet–drafts/draft–ietf–pkix–proxy–01.txt.

* cited by examiner

Primary Examiner—Justin T. Darrow
(74) Attorney, Agent, or Firm—Glenn Patent Group; Michael A. Glenn

(57) ABSTRACT

The invention generates a temporary digital certificate with a useful life of only a few minutes to a few hours. An expiration time is attached to such temporary digital certificate by a secure computer platform that is presented with a user's smart-card. Expiration dates one or two years after the issuance of the smart-card are conventional. A digital certificate issued by a central authority is carried within the smart card and is used by the secure computer platform to generate temporary digital certificate. The temporary digital certificate functions as a proxy digital certificate that will allow the user to immediately pocket the smart card and thus avoid the possibility of forgetting it in a card reader.

14 Claims, 1 Drawing Sheet

DIGITAL CERTIFICATE PROXY

BACKGROUND OF THE INVENTION

1. Technical Field

The invention relates to so-called "smart cards" used in digital computer communication and networks, and more particularly, to digital certificate surrogates that do not require users to leave their smart cards in a reader for the duration of the secure communication.

2. Description of the Prior Art

Personal computers (PCs) are no longer used exclusively at the office. Home and recreational PC use has increased dramatically. Internet access now allows users to connect to the World Wide Web, newsgroups, and e-mail. Home users and businesses are also finding online shopping, or e-commerce, appealing because of the convenience, simplicity, and robustness. This widespread availability and acceptance of computers has dramatically increased the number of people with the ability to compromise data.

As prices continue to drop, and people become more comfortable with technology, the reliance on computer-based resources will continue to increase. As this dependence develops, security exposures may lead to disastrous results with possible financial and legal ramifications. At a minimum, a security breach will result in lost time and decreased productivity while a "clean up" effort occurs. More than likely however, the results will be much worse. Financial losses as well as non-monetary effects could occur.

Businesses today demand accurate and secure handling of electronic information. The National Security Agency's FORTEZZA program addresses this demand by providing the technology to enable value-added security services for unclassified but sensitive information. FORTEZZA technology provides data integrity, originator authentication, non-repudiation (undeniable proof of one's identity), and confidentiality (data privacy). FORTEZZA personalizes security through an individualized cryptographic device, a PC Card called the FORTEZZA Crypto Card.

The Crypto Card includes the user's unique cryptographic key material and related information, and executes the cryptologic algorithms. A sophisticated infrastructure has been designed to generate, distribute, and control the cryptographic keys, control the integrity of the data on the Card, and disseminate required cryptographic and system information. FORTEZZA interfaces and specifications are designed with an "open system" philosophy. This permits seamless integration of the FORTEZZA technology into most data communication hardware platforms, operating systems, software application packages, and computer network configurations and protocols.

The increasing availability and use of electronic data presents new problems for individuals and businesses. The parties involved in the exchange of information can no longer use a person's voice, handwriting, or face to recognize the other party. However, the recipient must still have confidence in the integrity of the information and the identity of its originator. Developers of electronic messaging and data handling products must provide security services so parties can have confidence in the information.

Accurate and secure data must have four security attributes: data integrity, user authentication, user non-repudiation, and data confidentiality. Data integrity means the data has been processed by both the originator and the recipient, e.g., through a "hash" function. In a typical "hash" function, the data in the message is read through a mathematical algorithm which uses every bit in the message to form a uniformly sized string of bits unique to that message. Any change in the message, even a single bit, will cause the recipient's hash value to differ from the sender's hash value. Hash value integrity requires a method to secure the value and verify the originator of the hash function. This requires the message to have the user authentication attribute. User Authentication assures the recipient of the originators identity by cryptographically processing the data with an algorithm which incorporates parameters unique to the originator. The mechanism to perform this check must assure that the data could only be sent from the declared author. The algorithm must produce a result that is easy to verify yet difficult to forge. Authenticating the originator of a message can be performed by the hash and digital signature functions. Non-repudiation is a condition whereby the author of the data cannot repudiate the validity of the result used to authenticate the identity of that user. The technique used to identify the author must be strong enough so the authenticity of the message originator can be proven to a third party. Non-repudiation can be realized by using digital signatures, for example.

Confidentiality provides data privacy by encrypting and decrypting data, whereby only the intended recipient can read a message. Encrypted data renders the sensitive data, non-sensitive. Thus, encrypted data needs less physical data protection. To provide confidentiality, a technique must be established to provide a unique "key" for encryption of the data and the capability to transmit the key and other necessary information to the recipient to decrypt the data. The key provides a variable for each encryption session. This means that multiple encryption of the same plaintext will result in different cipher (encrypted) text. Some algorithms also require an Initialization Vector (IV), for added variability.

The National Security Agency (NSA) developed the FORTEZZA program for the Department of Defense (DoD) in response to the growing need for economical and secure electronic messaging. The DoD is incorporating the FORTEZZA technology into its Defense Message System (DMS) to secure its unclassified but sensitive information. The FORTEZZA technology satisfies the DMS security architecture with a user friendly, inexpensive, cryptographic mechanism that provides writer to reader message confidentiality, integrity, authentication, non-repudiation, and access control to messages, components, and systems. While the DMS exposed the DoD to the need for the FORTEZZA technology, the same security requirements are valid today for civilian agencies, commercial businesses, and private citizens.

Microsoft announced at the Cartes '98 conference in Paris a standards-based platform that provides secure storage for security, loyalty and ePurse solutions in the Microsoft WINDOWS operating system. Smart Cards for Windows makes Windows-based development and run-time environments available to the smart card industry. Microsoft was joined at the announcement at the Cartes '98 conference in Paris by Schlumberger Electronic Transactions and Gemplus Associates International, and by pilot customers Merrill Lynch Company Inc. and Cable & Wireless. This enables card issuers and designers to employ their existing expertise in Windows to develop and deploy a broader range of smart card usage and applications than with other smart card systems. Typical solutions enabled by smart cards are secure network authentication, secure corporate transactions, online banking, debit, credit, electronic cash and customer loyalty programs.

A common, and all too human, problem with smart cards is that they are left in card readers. The problem even extends to automated teller machines (ATMs), where bank customers forget to take their cards. Some ATMs now avoid this problem by allowing the bank customer to hold his ATM card throughout the transaction, requiring only that the card be "swiped" through a card reader.

SUMMARY OF THE INVENTION

According to the present invention, a temporary digital certificate is generated having a useful life of a relatively short period of time, for example, a few minutes to a few hours. An expiration time is attached to the temporary digital certificate by a secure computer platform that is presented with a user's long-term digital certificate, which may be contained in a smart card, for example. The long-term digital certificate issued by a central authority is carried within the smart card. A short-term proxy is generated from the long-term digital certificate in the smart card and copied into the secure computer platform. This temporary digital certificate functions as a surrogate for the long-term digital certificate and allows the user to immediately remove the smart card from a card reader and pocket the smart card, thus avoiding the possibility of forgetting the card in a card reader.

DETAILED DESCRIPTION OF THE INVENTION

Figure 1:
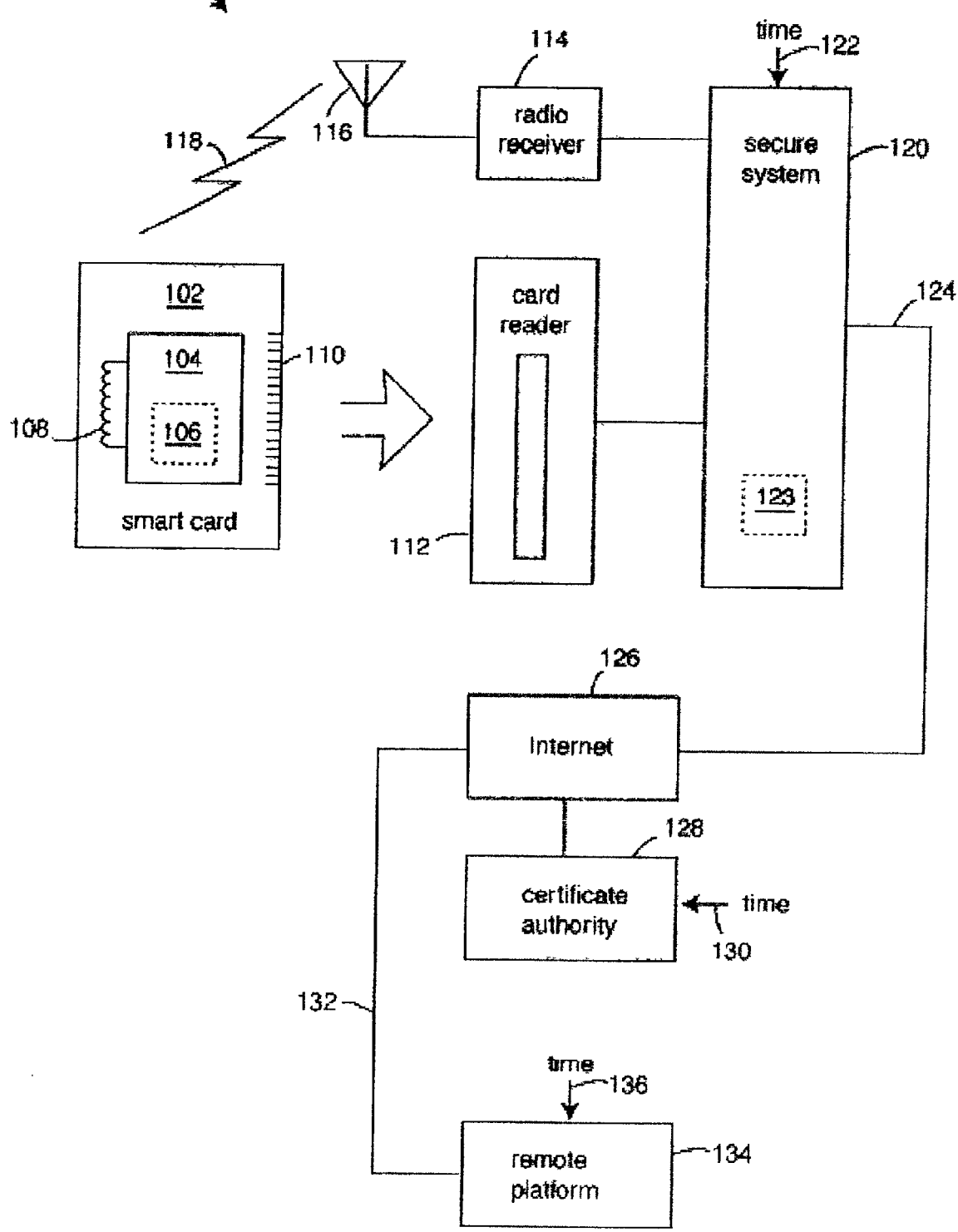
FIG. 1 is a block diagram of a computer-user authentication system according to the present invention.

FIG. 1 represents a computer-user authentication system according to the present invention, and is referred to herein by the general reference numeral 100. System 100 includes smart-card 102 with embedded microcomputer 104 that includes a digital certificate 106. An expiration date is associated with digital certificate 106 that will make possession of smart card 102 unavailing after the expiration date. In practice, the expiration date of the digital certificate 106 may be one year after the date of first issuance, so the digital certificate 106 is referred to herein as a long-term digital certificate.

Radio antenna 108 allows for wireless communication of digital certificate 106 by microcomputer 104. A set of electrical contacts 110 allows for wireline communication of digital certificate 106 by microcomputer 104. Alternate embodiments of the present invention may not use both radio antenna 108 and electrical contacts 110. As an example, it may be advantageous in particular applications to require the use of electrical contacts 110 as a first step so that accidental collocation of smart card 102 with a secure access computer is not possible. Once the intent-to-authorize a secure communication has been determined, the secure communication can be continued as long as the smart card maintains its radio contact through the radio antenna 108.

In operation, smart-card 102 is kept and used as a physical token or key by a user to enable secure communication with other users. Smart-card 102 is inserted into smart-card reader 112 that connects to electrical contacts 110. Reader 112 then can read the signed statements (digital certificate 106). Alternatively, radio transceiver 114 having antenna 116 may read digital certificate 106 over radio link 118. Secure digital communication platform 120 operates radio transceiver 114 and smart-card reader 112 as peripherals. Secure digital communication platform 120 may comprise, for example, a conventional personal computer system with a network interface.

A time standard 122 is input to secure digital communication platform 120 and is used to generate short-term digital certificate 123 from information included in long-term digital certificate 106. In essence, short-term digital certificate 123 is a proxy (e.g. an authorized replica) of long-term digital certificate 106 that will automatically become ineffective after smart card 102 has left the immediate area of secure digital communication platform 120 and/or after an expiration time has run.

A principal advantage of the present invention is that a user will not leave a smart card in a reader. The smart card is needed only to initiate a secure communication. The continuation and maintenance of the secure communication is thereafter dependent on a "virtual smart card" that is constructed for temporary use in the computer platform, e.g., short-term digital certificate 123. Therefore, typical expiration times attached to a short-term digital certificate will be on the order of a few minutes to a few hours. An unauthorized user will no longer be able to take advantage of a smart-card mistakenly left in a card reader, and cannot come in later after a secure communication has ended to resume any use.

In FIG. 1, secure digital communication platform 120 has a network connection 124 to the Internet 126. Central certificate authority 128 is also connected to the Internet 126 and has a time-standard input 130. Central certificate authority 128 is the original issuer of long-term digital certificate 106 and keeps records as to its expiration date. Central certificate authority 128 can also recognize short-term digital certificate 123 as being a legitimate proxy of long-term digital certificate 106. The built-in expiration time included in short-term digital certificate 123 will be used to validate and authenticate communications as belonging to the corresponding users.

Network connection 132 connects the Internet 126 to remote platform 134. A time-standard input 136 allows remote platform 134 to test the expiration time of short-term digital certificate 123 and/or the expiration date of long-term digital certificate 106. Remote platform 134 must verify the identity of a user at secure digital communication platform 120. The user's identity is confirmed by reading and testing short-term digital certificate 123 and/or long-term digital certificate 106, and then checking these certificates with those obtained from central certificate authority 128. Short-term digital certificate 123 is then usable as a key to encrypt and decrypt messages according to conventional methods.

Time-standard inputs 122, 130 and 136 may be ordinary electronic clocks, but may also be government radio broadcasts of time, e.g., radio station WWV in the United States or microwave transmissions from orbiting GPS navigation satellites. It can also be beneficial to equip microcomputer 104 to be able to read government radio transmissions through radio antenna 108, e.g., for anti-spoofing or self-destruction.

Embodiments of the present invention can be used in conjunction with any of several security-industry devices, protocols, and encryption methods, including, merely by way of example, FORTEZZA, SSL, or Client Auth.

Computer-user authentication system embodiments of the present invention comprise a physical token that can be carried by a user and introduced to a computing platform. A long-term digital certificate is disposed in the physical token. A short-term digital certificate is generated from the long-term digital certificate by the smart card whenever the physical token is proximate. In alternative embodiments, the physical token comprises a smart-card and is introduced to the secure computing platform by bringing it into electrical contact such that the long-term digital certificate can be read. In other alternative embodiments, the long-term digital certificate is issued by a centralized certificate authentication authority and includes an expiration date. The short-term digital certificate is substantially an authorized proxy of the long-term digital certificate and includes an expiration time that is dependent on a separation time at which the physical token leaves its proximity with the secure computing platform.

In alternative embodiments of the present invention, the physical token comprises a microcomputer that is introduced to the secure computing platform by establishing contact such that the long-term digital certificate can be read. The physical token comprises a microcomputer and is introduced to the secure computing platform by bringing it first into actual electrical contact and then keeping it near enough to maintain contact such that a short-term proxy can be periodically read. Such short-term digital certificate includes an expiration time that is dependent on a separation time in which the radio contact discontinues.

A centralized certificate authentication authority in network communication with the secure computing platform is the original issuer of the long-term digital certificates. A time standard is preferably supplied to both the centralized certificate authentication authority and the secure computing platform, and provides for a test of the expiration time for the short-term digital certificate and the expiration date of the long-term digital certificate.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A computer-user authentication system, comprising:
    a physical token that can be carried by a user and introduced to a secure computing platform;
    a long-term digital certificate disposed in the physical token; and
    a short-term digital certificate authorized by the long-term digital certificate and generated by said physical token when the physical token is proximate thereto.

2. The computer-user authentication system of claim 1, wherein:
    the physical token comprises a smart-card and is introduced to said computing platform by bringing it into electrical contact such that the short-term digital certificate can be read.

3. The computer-user authentication system of claim 1, wherein:
    the long-term digital certificate is issued by a centralized certificate authentication authority and includes an expiration date.

4. The computer-user authentication system of claim 1, wherein:
    the short-term digital certificate is substantially a proxy of the long-term digital certificate and includes an expiration time that is dependent on a separation time in which the physical token leaves its proximity with said secure computing platform.

5. The computer-user authentication system of claim 1, wherein:
    the physical token comprises a microcomputer and is introduced to said secure computing platform by bringing it near enough to establish contact such that a short-term digital certificate proxy can be read.

6. The computer-user authentication system of claim 1, wherein:
    the physical token comprises a microcomputer and is introduced to said secure computing platform by bringing it first into actual electrical contact and then keeping it near enough to maintain contact such that the long-term digital certificate can be periodically read; and
    the short-term digital certificate is a proxy of the long-term digital certificate and includes an expiration time that is dependent on a separation time in which said contact discontinues.

7. The computer-user authentication system of claim 1, further comprising:
    a centralized certificate authentication authority in network communication with said secure computing platform and which originally issued the long-term digital certificate; and
    a time standard supplied to both the centralized certificate authentication authority and said secure computing platform, and providing for a test of an expiration time for the short-term digital certificate and an expiration date of long-term digital certificate.

8. A method of computer-user authentication, comprising the steps of:
    introducing a long-term digital certificate with an expiration date to a computer platform through a physical token proximate thereto;
    generating a short-term digital certificate with an expiration time from said long-term digital certificate; and
    using said short-term digital certificate as a proxy digital certificate in subsequent secure communications.

9. The method of computer-user authentication of claim 8, wherein:
    said expiration time cannot exceed said expiration date.

10. The method of computer-user authentication of claim 8, wherein:
    proximity between a smart card within said physical token and said computer platform is a prerequisite to the step of generating.

11. The method of computer-user authentication of claim 8, wherein:
    a radio contact between a smart card within said physical token and said computer platform is a prerequisite to the step of generating.

12. The method of computer-user authentication of claim 8, further comprising the step of:
    dissolving said short-term digital certificate after said expiration time.

13. The method of computer-user authentication of claim 8, further comprising the step of:
    dissolving said short-term digital certificate when an electrical contact between a smart card within said physical token and said computer platform is discontinued.

14. The method of computer-user authentication of claim 8, further comprising the step of:
    dissolving said short-term digital certificate when a radio contact between a smart card within said physical token and said computer platform is discontinued.

* * * * *